United States Patent Office 2,923,738
Patented Feb. 2, 1960

2,923,738
ADDITION PRODUCTS OF N-ALKYL-γ-HYDROXY-CARBOXYLIC ACID AMIDES AND ALKANOLAMINES

Earl P. Williams, Pen Argyl, Pa., and Raymond L. Mayhew, Phillipsburg, N.J., assignors to General Aniline & Film Corporation, New York, N.Y., a corporation of Delaware No Drawing. Application May 8, 1958
Serial No. 733,831

12 Claims. (Cl. 260—561)

The present invention relates to new compositions of matter having varied uses and applications, and more particularly to addition products of N-alkyl-γ-hydroxycarboxylic acid amides and alkanolamines.

It is known that monobasic organic carboxylic acids such as the fatty acids, containing from 2 to 20 carbon atoms can be condensed with an alkanolamine, arylamine or aralkylamine by modification of temperature and time of treatment to yield products readily dispersible in water. During the condensation reaction from 1 to 3 moles of water are split down depending upon the number of moles of amine employed. In all cases, regardless of the carboxylic acid or the amine employed, a dark oily liquid is obtained.

We have found that by treating 1 mole of an N-alkyl-γ-hydroxycarboxylic acid amide with 1 mole of an alkanolamine at a temperature between 100° and 160° C. an addition product is obtained which is not readily dispersible in water. As a matter of fact, it is relatively water insoluble. Further distinguishing features are that the addition product is of light color and of a waxy nature provided the treatment be maintained at a temperature between 100° and 160° C. By increasing the temperature and time of treatment, dark oily water dispersible liquids are obtainable.

An object of the present invention is to provide a waxy water insoluble class of products having new and useful applications and readily obtainable by the treatment of an N-alkyl-γ-hydroxycarboxylic acid amide and an alkanolamine.

Further objects and advantages will become more clearly apparent from the following description.

The new and useful addition products of the present invention are readily obtainable by heating at a temperature between 100° and 160° C. 1 mole of an alkanolamine with 1 mole of an N-alkyl-γ-hydroxycarboxylic acid amide having the following general formula:

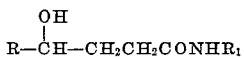

$$R-\overset{\overset{\displaystyle OH}{|}}{C}H-CH_2CH_2CONHR_1$$

wherein R represents either hydrogen or a methyl group, and $R_1$ represents at least one aliphatic hydrocarbon of from 3 to 18 carbon atoms. The aliphatic hydrocarbon may be either saturated or unsaturated and is derived from an unsaturated or saturated aliphatic primary amine.

The compounds characterized by the foregoing general formula are obtained by the reaction of 1 mole of an aliphatic N-primary amine or mixtures of such amines containing from 3 to 18 carbon atoms with 1 mole of either γ-butyrolactone or γ-valerolactone at a temperature of 80–95° C. as disclosed in application Serial No. 625,224, filed on November 30, 1956. The complete disclosure of this application is incorporated herein by reference to the various N-alkyl-γ-hydroxycarboxylic acid amides which are useful as one of the components in accordance with the present invention and to the method of preparing the same.

As examples of the N-alkyl-γ-hydroxycarboxylic acid amides characterized by the foregoing formula, the following are illustrative:

(1) $HO-CH_2CH_2CH_2CONHCH_2CH=CH_2$

The reaction product of allylamine and γ-butyrolactone (2) 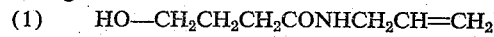
$$CH_3-\overset{\overset{\displaystyle OH}{|}}{C}H-CH_2CH_2CONHCH_2CH=CH_2$$

The reaction product of allylamine and γ-valerolactone (3) $HO-CH_2CH_2CH_2CONH(CH_2)_3CH_3$ The reaction product of n-butylamine and γ-butyrolactone (4) 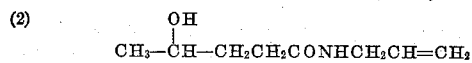
$$CH_3-\overset{\overset{\displaystyle OH}{|}}{C}H-CH_2CH_2CONH(CH_2)_7CH_3$$

The reaction product of n-octylamine and γ-valerolactone (5) $HO-CH_2-CH_2-CH_2-CONHCH_2(CH_2)_8CH_3$ The reaction product of N-decylamine and γ-butyrolactone (6) 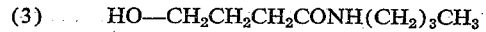
$$CH_3-\overset{\overset{\displaystyle OH}{|}}{C}H-CH_2-CH_2CONHCH_2(CH_2)_8CH_3$$

The reaction product of N-decylamine and γ-valerolactone (7) $HO-CH_2-CH_2-CH_2CONHCH_2(CH_2)_{12}CH_3$ The reaction product of N-tetradecylamine and γ-butyrolactone (8) $HO-CH_2-CH_2-CH_2CONHCH_2(CH_2)_{14}CH_3$ The reaction product of N-cetylamine and γ-butyrolactone (9) $HO-CH_2-CH_2-CH_2CONHCH_2(CH_2)_{16}CH_3$ The reaction product of octadecylamine and γ-butyrolactone

(10) The reaction product of 1 mole (86.1 grams) of γ-butyrolactone with 1 mole (274 grams) of a commercially available mixture of amines having the following composition; hexadecylamine 10%, octadecylamine 10%, octadecenylamine 35%, octadecadienylamine 45%.

(11) The reaction product of 1 mole (86.1 grams) of γ-butyrolactone and 1 mole (206 grams) of a commercially available mixture of coconut amines having the following composition: octadecenylamine 5%, octadecylamine 5%, hexadecylamine 8%, tetradecylamine 18%, dodecylamine 47%, decylamine 9%, octylamine 8%.

(12) The reaction product of 1 mole (86.1 grams) of γ-butyrolactone and 1 mole (276 grams) of a commercially available mixture of amines having the following composition: hexadecylamine 6%, octadecylamine 93%, octadecenylamine 1%.

(13) The reaction product of 1 mole (86.1 grams) of γ-butyrolactone and 1 mole (213 grams) of N-tetradecylamine.

(14) The reaction product of 1 mole (86.1 grams) of γ-butyrolactone and 1 mole (162 grams) of a commercially available mixture of amines having the following composition: octylamine 3%, decylamine 90%, dodecylamine 7%.

(15) The reaction product of 1 mole (86.1 grams) of γ-butyrolactone and 1 mole (220 grams) of a commercially available mixture of amines having the following composition: octadecenylamine 2%, hexadecylamine 4%, dodecylamine 4%, tetradecylamine 90%.

(16) The reaction product of 1 mole of γ-butyrolactone and 1 mole of a commercially available mixture of amines obtained from soyabean oil and having the following composition: hexadecylamine 10%, octadecylamine 10%, octadecenylamine 35%, octadecadienylamine 45%.

(17) The reaction product of 1 mole of γ-butyrolactone and 1 mole of a commercially available mixture of amines obtained from N-hydrogenated tallow oil amine having the following composition: hexadecylamine 25%, octadecylamine 70%, octadecenylamine 5%.

(18) The reaction product of 1 mole of γ-butyrolactone and 1 mole of a commercially available mixture of amines obtained from tallow fatty acids having the following composition: hexadecylamine 30%, octadecylamine 25%, octadecenylamine 45%.

As examples of alkanolamines which are treated with the N-alkyl-γ-hydroxycarboxylic acid amide, the following are illustrative:

| | |
|---|---|
| Monoethanolamine | Dipentanolamine |
| Diethanolamine | Hexanolamine |
| Triethanolamine | Cyclohexylethanolamine |
| Diethylethanolamine | N-phenylethanolamine |
| Butanolamine | Palmitylolamine |
| Isobutanolamine | Laurylolamine |
| Tributanolamine | Stearylolamine |
| Pentanolamine | |

In lieu of the foregoing alkanolamines, the various alkanolamine derivatives obtained from glycerine, sugar, including mono- and poly-valent alcohols, etc., and cycloalkyl alkanolamines may be employed. In fact, any alkanolamine having the following general formula can be used:

wherein $R_2$ represents a hydroxy alkyl group of 1 to 18 carbon atoms, $R_3$ and $R_4$ represent either hydrogen, alkyl of 1 to 5 carbon atoms, cycloalkyl, hydroxyalkyl of 1 to 5 carbon atoms or phenyl.

The addition process is in itself extremely simple. The N-alkyl-γ-hydroxycarboxylic acid amide is merely heated with 1 mole of an alkanolamine from 1 to 4 hours at a temperature between 100° and 160° C. The addition takes place without any loss of water or change in weight of the initial components. This observation definitely precludes any chemical condensation. Although after considerable investigation, we have found that it is impossible at the present time to definitely ascertain the exact nature of the addition product, we surmise that one possible explanation of this behavior is that a physiochemical change took place on heating and the molecules of the alkanolamine and the N-alkyl-γ-hydroxycarboxylic acid amide are combined into oriented groupings or micelles. One might assume from the fact that since no loss of water or change in weight takes place during the heating or addition period that the product formed is simply a mixture of the various components. Such however, is not the case, as will be clearly demonstrated in Examples IX and X that will follow, and accordingly for this reason we do not wish to limit ourselves to compounds or products having a specific formula but rather to a process for producing novel compositions of matter and the compositions resulting from such a process.

The addition products of the present invention have varied industrial uses and applications including agriculture. For example, they are not only effective in the control of agricultural pests but also effective as softening agents and antistatic agents in the textile industry, as corrosion inhibitors, oil well adjuvants, textile foam stabilizers, as components in metal cleaning compositions, dry cleaning compositions and as additives for road building materials such as asphalt compositions. In addition, the products are valuable for use in cutting oils, anti-fogging agents, additives to skin creams, lotions, salves and other cosmetic preparations.

The following examples will illustrate the manner in which the addition products of the present invention are prepared and the manner in which they may be employed to give new and useful results.

EXAMPLE I 1 mole (248.1 grams) of N-decyl-γ-hydroxybutyramide of illustration (5) were heated together with 149.1 grams (1.0 mole) of triethanolamine at 150–155° C. for 3 hours. The light tan waxy solid which formed on cooling weighed 397 grams.

The resulting product was found to gel petroleum ether and passed the Baker-Jones-Zisman Static Drop test (Ind. Eng. Chem. 40, 2338 (1948) and Ind. Eng. Chem. 41, 137 (1949) for rust inhibition in crankcase oil. In this test a standard prepared indented steel test specimen is introduced under the surface of the oil system under scrutiny and a drop of water is placed in the indentation. The system is held at 60° C. for 48 hours and then examined. The oil system fails the test if there are visible signs of staining or rusting of the steel. Concentrations of the inhibitor in the oil were run at 2.0% and 0.5%.

The product was also found to give 80% protection in 100 p.p.m. in preventing rust in oil well brine involving a two phase system of kerosene and a 5% sodium chloride brine containing hydrogen sulfide. The test involves a two phase system of kerosene and a 5% sodium chloride brine containing hydrogen sulfide. To this is added the inhibitor. A weighed steel panel is first immersed in the organic phase for 10 seconds and then in the brine phase for 7 days. After descaling electrolytically the panel is reweighed and a percentage of protection is calculated by comparison with a panel in an uninhibited system.

EXAMPLE II 58.4 grams (0.2 mole) of N-coconut alkyl-γ-hydroxybutyramide of illustration (11) were heated together with 21.0 grams (0.2 mole) of diethanolamine at 120–140° C. for 2 hours and poured at 60° C. into trays to harden. A light tan waxy solid formed on cooling to 51–52° C. It weighed 79 grams. This product gels crankcase oil and passes the Baker-Jones-Zisman Static Drop test for rust inhibition.

At 100 p.p.m. in the oil well brine test described in Example I, this product was 89.9% effective as compared to the starting N-coconut alkyl-γ-hydroxybutyramide alone which was only 41.8% effective.

In addition this product was a very effective laundry softener when tested at 0.1% conc. whereas the starting N-coconut alkyl-γ-hydroxybutyramide and little or no softening action.

EXAMPLE III

This example is a modification of the procedure of the preceding examples for the preparation of the addition product of N-coconut alkyl-γ-hydroxybutyramide and diethanolamine in a one step operation. We have found that γ-butyrolactone will react much more readily with the primary fatty amines at 80–85° C. than it will with the secondary alkanolamines at this temperature.

It was possible, therefore, to charge the fatty amine and the secondary or tertiary alkanolamine together prior to the addition of the γ-butyrolactone. The reaction is held at 80° C. for 2–3 hours and then raised to 150° C. for an additional 2 hours as follows:

103.0 grams (½ mole) of the mixture of amines listed in illustration (11), commercially available under the brand name of "Armeen C.D.," and 52.5 grams (½ mole) of diethanolamine were heated together to 80° C. 43.0 grams (½ mole) of γ-butyrolactone were then added over a period of ½ hour at 80–83° C. and then held at this temperature for an additional 2 hours before raising the temperature to 150° C. and holding for 2 hours longer. A soft wax was formed on cooling to 51–52° C. The addition product thus formed was found by infra red analysis to be identical to the addition product formed in Example II.

EXAMPLE IV 61.2 grams (0.2 mole) of N-tetradecyl-γ-hydroxybutyramide of illustration (7) were heated together with 21.0 grams (0.2 mole) of diethanolamine at 140–158° C. for 2½ hours. The final weight of the light colored waxy solid was 82.1 grams.

This product was found to gel crankcase oil and passed the Baker-Jones-Zisman Static Drop test for rust inhibition, as described in Example I.

EXAMPLE V 226.6 grams (0.6 mole) of N-soya alkyl-γ-hydroxybutyramide of illustration (16) were heated together with 63.1 grams (0.6 mole) of diethanolamine at 135–143° C. for 2 hours. The final weight of the tan waxy solid was 289.5 grams.

This product was found to be an excellent antistatic agent for nylon, Orlon, Dacron and Acrilan. The electrostatic properties of a fabric are obtained by measuring surface electrical resistivity. Electrical resistivity influences the accumulation of electrostatic charge on a fabric. The product was padded on the fabric in concentrations of 1% by weight and then conditioned in a testing chamber at the desired relative humidity and temperature. The selected conditions depend on the end-use requirements of the fabric. The specimens are evaluated by computing the resistance in ohms measured by a calibrated electrical resistance meter and reported as the logarithm of the average of three calculated resistivities in ohms per square 7 fabric.

EXAMPLE VI 2856.8 grams (8.0 moles) of N-tallow alkyl-γ-hydroxybutyramide of illustration (18) were heated together with 840.8 grams (8.0 moles) of diethanolamine for 4 hours at 120–153° C. The final weight of the light tan waxy solid was 3696 grams.

EXAMPLE VII 71.6 grams (0.2 mole) of N-hydrogenated tallow alkyl-γ-hydroxybutyramide of illustration (17) were heated together with 21.0 grams (0.2 mole) of diethanolamine for 2¼ hours at 140–160° C. The final weight of the light tan waxy solid was 92.5 grams.

This product was found to gel crankcase oil and passed the Baker-Jones-Zisman Static Drop test for rust inhibition as described in Example I.

EXAMPLE VIII 108.6 grams (0.3 mole) of N-octadecyl-γ-hydroxybutyramide of illustration (9) were heated together with 31.5 grams (0.3 mole) of diethanolamine for 2 hours at 133–142° C. A light tan waxy solid formed on cooling to 77–78° C. It weighed 140 grams.

EXAMPLE IX

This example shows the effect of heating at temperatures above 160° C.

173 grams of the addition product prepared in Example II were heated to 165° C. for a period of 2 hours. A total of 2 moles of water (16.7 grams) was found in the distillate which weighed 36.3 grams. The final reaction product weighed 136 grams, was a dark liquid, and was readily dispersible in water. The product from Example II by comparison was a light colored waxy solid which was not dispersible in water and was formed without apparent loss of water.

EXAMPLE X

The results of testing the addition product of Example II against a mechanical mixture (unheated) of N-coconut alkyl-γ-hydroxybutyramide with diethanolamine in the oil well brine test described in Example I at 100 p.p.m. showed 89.9% and 60.8% protection respectively. This illustrates the advantage of heating the components between 100–160° C.

As stated above, the addition products of the present invention are also adaptable in view of their exceptional activity for the control of agricultural and horticultural pests such as insects, fungi and nematodes. For this purpose they may be employed in the form of dispersions in a liquid or a solid carrier. Thus for example, the addition products may be dispersed in any of the conventionally employed petroleum hydrocarbons particularly isoparaffinic hydrocarbons available commercially under the brand name of "Solstrols," straight chain hydrocarbons, naphthas, deodorized kerosene and the like. The choice of solvents selected will depend upon its permeability in soil so as to carry the toxic concentration therethrough. Solutions of the addition products in any of the conventional liquid carriers may contain from 1 to 15% by weight of the toxicant. In lieu of solutions, aqueous emulsions may also be employed where it is desirable to drench the soil such as in greenhouse benches and the like. The addition products may also be employed in admixture in a solid carrier so that the final composition can be applied by the well known dusting methods. Suitable carriers for such purpose include pumice, talc, clay, kieselguhr, bentonite, infusorial earth or any one of the currently employed and well known carriers.

We have found that a very satisfactory method of employing the addition products of the present invention in the control and eradication of nematodes is to inject the addition product per se or in a liquid or solid carrier directly into the soil in a concentration ranging from 1 to 15% or on a weight basis of from 0.001 to 20%.

In establishing the efficiency of the addition products as effective agricultural pest control agents, the following test was employed:

*Nematocide screening test*

The method consists of fumigating a brei of heavily infested roots of tomato plants in moist sand for 24 hours prior to suspending the sample on No. 100 mesh stainless steel screens in adequate water.

Duplicate 100 gram samples of dry sand are mixed with 5 gram samples of a brei of tomato roots infested with root-knot nematodes, *Meloidogyne incognita*, the brei is prepared by cutting tomato roots of infested plants into quarter inch lengths, then further macerating in a Waring Blendor for 1 minute. The sand and the brei are mechanically mixed by shaking for 1 minute in a closed Mason jar. The mixture is transferred to 2¼" clay pots at which time 50 mg. of test chemical is added to the mixture. Each pot is then wrapped in Saran and allowed to stand for 24 hours.

The mixture is then transferred to stainless steel cylindrical screens approximately 2½" high and 3½" in diameter. The screen material is 100 mesh stainless steel wire cloth. These screens are placed in the bottom half of a 9 cm. Petri dish containing 25 ml. of water and covered with the Petri dish cover. In a short time an additional 10 ml. of distilled water is added to each plate in order that free water will be available in the dish. After 24 hours, microscopic counts are made of the living nematodes which have migrated through the screen and into the Petri dish.

In the case of the non-fumigant chemicals, nematodes may not make adequate contact with the chemical until after the water is added, therefore, these chemicals are read 48 hours after transferring to the screen.

An effective water soluble non-fumigant chemical may let nematodes pass the screen but would immobilize the nematodes in the Petri dish.

Nematode counts are made by microscope. At least 10 fields are read or 150 nematodes counted per dish. Each nematocidal compound is run in duplicate.

The addition products of Examples I to VIII were subjected to the foregoing screening test with the following results:

| Nematocide Compound | Living Nematodes in 10 Fields |
|---|---|
| Addition product of Example: | |
| I | 8 |
| II | 7 |
| III | 7 |
| IV | 9 |
| V | 8 |
| VI | 10 |
| VII | 9 |
| VIII | 8 |
| Blank | 65 |

In order to determine fungicidal properties of the addition products, the following test procedure was employed:

Light blight fungus, *Phytophthora infestans*, is the organism used in this test procedure. The organism is reared on sterile wheat seeds in flasks kept at room temperature. Organism used are transferred 10 days prior to testing. A slurry made of the mycelia and this is broken up by means of a Waring Blendor before application to the test plants.

Duplicate tomato plants Bonny Best variety 4–5" high are placed on a rotating turntable and sprayed with the candidate test chemical formulated in water, acetone and Igepal. 100 to 110 ml. of solution is applied to the pair of plants using a De Vilbiss spray gun with air pressure set at 40 lbs. Application of this spray takes 30 seconds and the foilage is wetted to run off. The test solution is formulated to contain 1000 p.p.m. 6 plants are sprayed with the formulation without test chemicals and are held as checks. An additional 6 plants are sprayed with Captan and are held for comparison standards. As soon as the spray has dried the plants are inoculated by again placing them on the turntable and spraying with the mycelial brei for 30 seconds.

Following inoculation the plants are incubated for 48 hours at 72° F. and at 100% relative humidity. The plants are then removed from the incubation chamber and placed in a shade house in the greenhouse for an additional 48 hours.

The total number of lesions per eleven 15× magnification fields on 11 leaflets of the three top leaves of each plant are counted. A similar count is made on the check plants and on the plants treated with standard: the average number of lesions per plant is calculated. Control is rated according to the following designations:

A = no control
B = no more than 25 lesions per plant
C = 15–24 lesions per plant
D = 6–14 lesions per plant
E = 0–5 lesions per plant The results of the above test (100 p.p.m.) with a blank, Captan (N-trichloromethylthiotetrahydrophthalimide) as a standard and the addition products are as follows:

| Fungicide Compound | Rating |
|---|---|
| Blank | A |
| Captan | D |
| Product of Example: | |
| I | D |
| II | D |
| III | D |
| IV | D |
| V | D |
| VI | D |
| VII | D |
| VIII | D |

We claim:

1. A new composition of matter consisting of the addition product of N-alkyl-γ-hydroxycarboxylic acid amide with an alkanolamine, said addition product being obtained by treating at a temperature between 100° and 160° C. 1 mole of at least one N-alkyl-γ-hydroxycarboxylic acid amide having the following general formula:

$$R-\overset{OH}{\underset{|}{C}H}-CH_2CH_2CONHR_1$$

wherein R represents a member selected from the class consisting of hydrogen and methyl and $R_1$ represents an alkyl hydrocarbon of from 3 to 18 carbon atoms with 1 mole of an alkanolamine having the following general formula:

$$\begin{array}{c} R_2 \\ | \\ N-R_3 \\ | \\ R_4 \end{array}$$

wherein $R_2$ represents a hydroxyalkyl group of 1 to 18 carbon atoms, and $R_3$ and $R_4$ represent a member selected from the class consisting of hydrogen, alkyl of 1 to 5 carbon atoms, hydroxy alkyl of 1 to 5 carbon atoms and phenyl.

2. A new composition of matter according to claim 1 wherein the product consists of the addition of 1 mole of N-decyl-γ-hydroxy butyric acid amide with 1 mole of triethanolamine.

3. A new composition of matter according to claim 1 wherein the product consists of the addition of 1 mole of diethanolamine with 1 mole of said N-alkyl-γ-hydroxycarboxylic acid amide which consists of the reaction product of 1 mole of γ-butyrolactone with 1 mole of a mixture of amines having the following composition:

| | Percent |
|---|---|
| Octadecenylamine | 5 |
| Octadecylamine | 5 |
| Hexadecylamine | 8 |
| Tetradecylamine | 18 |
| Dodecylamine | 47 |
| Decylamine | 9 |
| Octylamine | 8 |

4. A new composition of matter according to claim 1 wherein the product consists of the addition of 1 mole of diethanolamine with 1 mole of N-tetradecyl-γ-hydroxybutyric acid amide.

5. A new composition of matter according to claim 1 wherein the product consists of the addition of 1 mole of diethanolamine with 1 mole of said N-alkyl-γ-hydroxycarboxylic acid amide which consists of the reaction product of 1 mole of γ-butyrolactone with 1 mole of a mixture of amines having the following composition:

| | Percent |
|---|---|
| Hexadecylamine | 10 |
| Octadecylamine | 10 |
| Octadecenylamine | 35 |
| Octadecadienylamine | 45 |

6. A new composition of matter according to claim 1 wherein the product consists of the addition of 1 mole of N-octadecyl-γ-hydroxybutyric acid amide with 1 mole of diethanolamine.

7. The process of preparing the addition product of N-alkyl-N-hydroxycarboxylic acid amide with an alkanolamine which comprises treating at a temperature between 100° and 160° C. 1 mole of at least one N-alkyl-γ-hydroxycarboxylic acid amide having the following general formula:

$$R-\overset{OH}{\underset{|}{C}H}-CH_2CH_2CONHR_1$$

wherein R represents a member selected from the class consisting of hydrogen and methyl and $R_1$ represents an alkyl hydrocarbon of from 3 to 18 carbon atoms with 1 mole of an alkanolamine having the following general formula:

wherein $R_2$ represents a hydroxyalkyl group of 1 to 18 carbon atoms, and $R_3$ and $R_4$ represent a member selected from the class consisting of hydrogen, alkyl of 1 to 5 carbon atoms, hydroxy alkyl of 1 to 5 carbon atoms and phenyl.

8. The process according to claim 7 wherein the alkanolamine is triethanolamine and the N-alkyl-γ-hydroxycarboxylic acid amine is N-decyl-γ-hydroxybutyric acid amide.

9. The process according to claim 7 wherein the alkanolamine is diethanolamine and the N-alkyl-γ-hydroxycarboxylic acid amide consists of the reaction product of 1 mole of γ-butyrolactone with 1 mole of a mixture of amines having the following composition:

|  | Percent |
|---|---|
| Octadecenylamine | 5 |
| Octadecylamine | 5 |
| Hexadecylamine | 8 |
| Tetradecylamine | 18 |
| Dodecylamine | 47 |
| Decylamine | 9 |
| Octylamine | 8 |

10. The process according to claim 7 wherein the alkanolamine is diethanolamine and the N-alkyl-γ-hydroxycarboxylic acid amide is N-tetradecyl-γ-hydroxybutyric acid amide.

11. The process according to claim 7 wherein the alkanolamine is diethanolamine and the N-alkyl-γ-hydroxycarboxylic acid amide consists of the reaction product of 1 mole of γ-butyrolactone with 1 mole of a mixture of amines having the following composition:

|  | Percent |
|---|---|
| Hexadecylamine | 10 |
| Octadecylamine | 10 |
| Octadecenylamine | 35 |
| Octadecadienylamine | 45 |

12. The process according to claim 7 wherein the alkanolamine is diethanolamine and the N-alkyl-γ-hydroxycarboxylic acid amide is N-octadecyl-γ-hydroxybutyric acid amide.

No references cited.